Nov. 19, 1940. R. P. F. DE BERSAQUES 2,222,194
SOD-CUTTING IMPLEMENT
Filed April 4, 1938
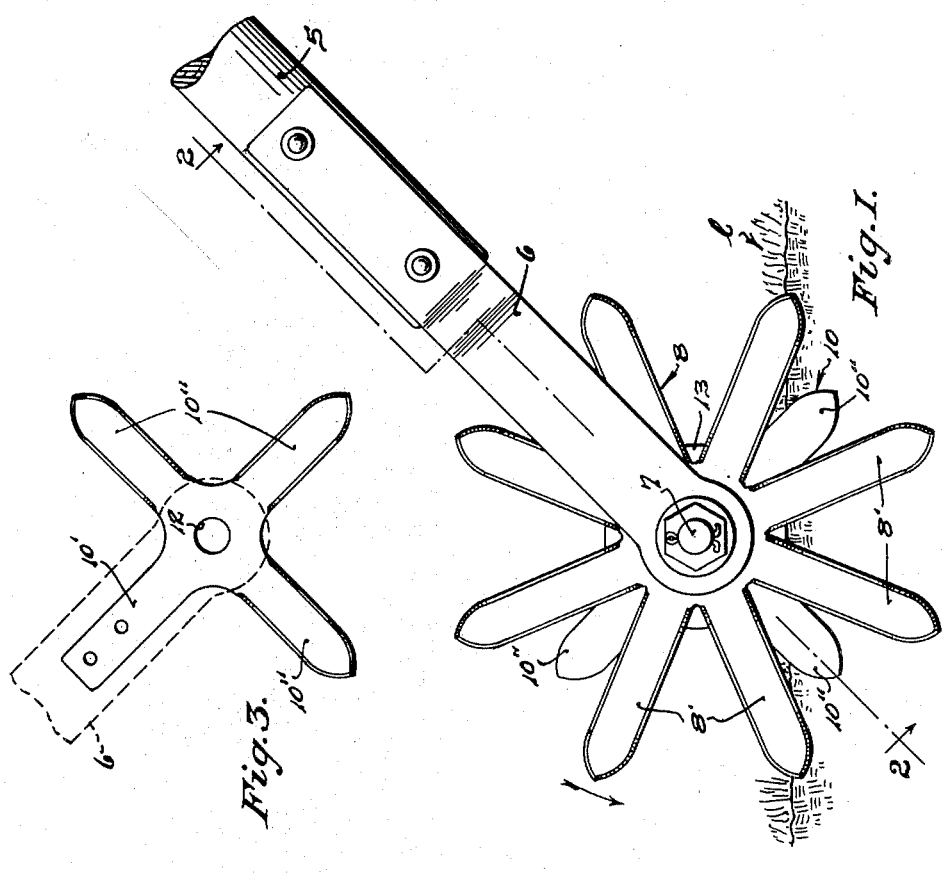
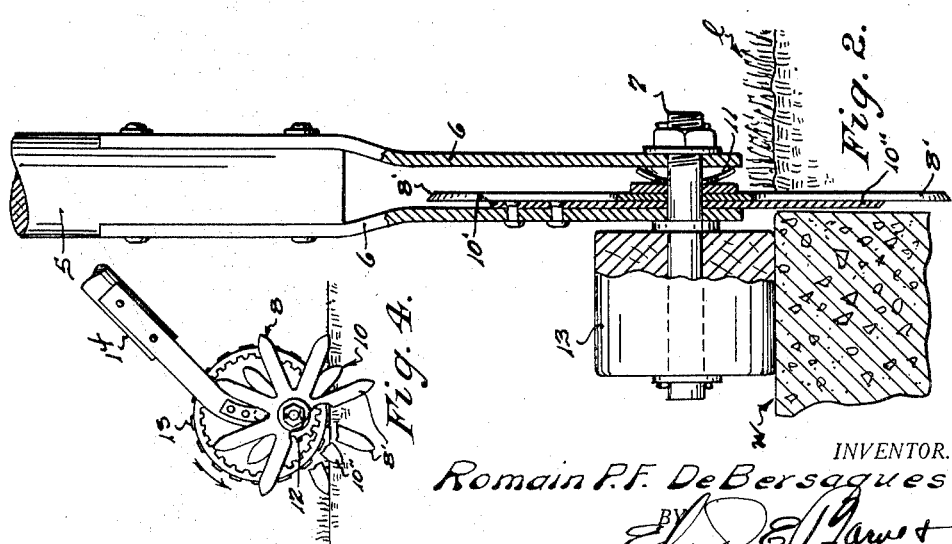
INVENTOR.
Romain P. F. DeBersaques
BY
ATTORNEYS.

Patented Nov. 19, 1940

2,222,194

UNITED STATES PATENT OFFICE 2,222,194

SOD-CUTTING IMPLEMENT

Romain P. F. De Bersaques, Seattle, Wash.

Application April 4, 1938, Serial No. 199,936

3 Claims. (Cl. 30—240)

This invention relates to lawn cutters and particularly to cutters of the character used to trim the lawn margins where the same skirt walks, shrubbery and the like. The principal object of the invention is to provide an especially improved implement in which stationary as well as moving blades are employed to thereby obtain an appreciably less resistant lawn-trimming action in which the cut is parallel to the plane of sliding contact of the contiguous blades rather than, as in previous single-blade arrangements, at right angles to the direction of travel of the cutter.

The invention consists in a movable star-wheel cutting blade and a stationary cutting blade complementing the same and so arranged in association therewith that the operation of cutting the sod is accomplished in the manner of a scissors coincidently with the movement of the implement over the surface of the lawn to be trimmed.

The invention further consists in the novel construction, adaptation and combination of parts hereinafter described and claimed.

In the drawing:

Figure 1 is a side elevation representing a cutting implement embodying the present invention in operative relation to a lawn, the handle for the device being shown fragmentarily.

Fig. 2 is a transverse section taken on the line 2—2 of Fig. 1.

Fig. 3 is a view detailing the stationary blade of the assembly; and

Fig. 4 is a side elevational view, partly broken away, representing a traction mounting for an implement embodying the present invention.

The reference numeral 5 denotes a handle, suitable for being grasped in the hand of the operator, such handle carrying a pair of spaced parallel cheek bars 6 which terminally are pierced for the reception of an axle-bolt 7, the axle-bolt revolubly supporting a star-wheel cutting blade 8 which is received in the space between one of the bars and a contiguous stationary cutter blade 10 fixedly carried by the other bar. 11 designates a dished spring-washer for maintaining tension as between the cutter blades. A shoulder formed on the axle-bolt to bear against the outer face of one of the bars 6 operates in conjunction with a nut and complementary washer, bearing against the outer face of the other bar, to oppose lateral springing as between the bars.

The blade 10 is desirably of the form shown in Fig. 3 which is to say that it is centrally bored as at 12 and provides, in radiating relation therefrom, a securing arm 10' and a series of three cutting fingers 10'' which in length are less than the radius of the blade 8 and lie relatively at angularities of 90°, 180° and 270° from the plane of the arm 10'. An angularity of 45° is preferred between each of the cutting fingers 8' of the movable cutter blade, providing an octogynous wheel. 13 represents a depth-gauging roller also carried by the axle-bolt 7, conventional with substantially all lawn cutters whether of the disk or star-wheel character.

The operation should be apparent from the illustration of the implement as it is applied to marginally define between a lawn, as represented by the letter $l$, and a walk $w$. The desirable manner of applying is with the stationary blade in abutting relation to the side of the walk.

It is to be pointed out that the device operates with appreciably less resistance than prior cutters and is especially effective for cutting strips of sod. An example of a manner of mounting the implement parts, particularly suitable for the latter work, is shown in Fig. 4 wherein the cutter blade 8 is fixedly carried by a gear 12 meshing the teeth of an internally geared traction wheel 13, the wheel 13 and the off-set gear 12 being journaled between cheek bars of a handle 14. One of the cheek bars fixedly supports the stationary cutter blade 10.

There is no intention in the foregoing to imply any unnecessary limitations excepting as the same are brought into the hereto annexed claims to distinguish from the prior state of the art.

What I claim, is:

1. A sod-cutting implement comprised of the combination of a star-wheel cutter blade supported for revoluble movement about a horizontal axis, and an abutting stationary shear finger of less length than the fingers of the star wheel complementing the latter, said stationary shear finger being located on a radial line depending from the axis of the cutter blade.

2. A sod-cutting implement comprised of the combination of a handle and two cutter blades carried at the lower end thereof of which one of the blades is fixed and the other revoluble, each of said blades being generally of star-wheel design supported to have the fingers radiate from a common center, but characterized in that the fingers of the fixed blade are of less length than the fingers of the revoluble blade.

3. A sod-cutting implement comprised of the combination of a handle having a yoke structure at the lower end thereof, an axle-bolt journaled through the side bars of the yoke, a stationary shear blade fixed to the inner face of one of the side bars and formed with a plurality of shearing fingers extending in radial relation to the axle-bolt, a star-wheel cutter blade of which the fingers are of greater length than those of the shear blade carried for revoluble movement by the axle-bolt and in shearing relation to the exposed face of said stationary blade, and tension devices received between the revoluble cutter blade and the other side bar of the yoke for yieldably influencing the revoluble cutter blade against the stationary shear blade.

ROMAIN P. F. DE BERSAQUES.